No. 744,271. PATENTED NOV. 17, 1903.
J. H. ADAMS.
WRENCH.
APPLICATION FILED APR. 20, 1903.
NO MODEL.
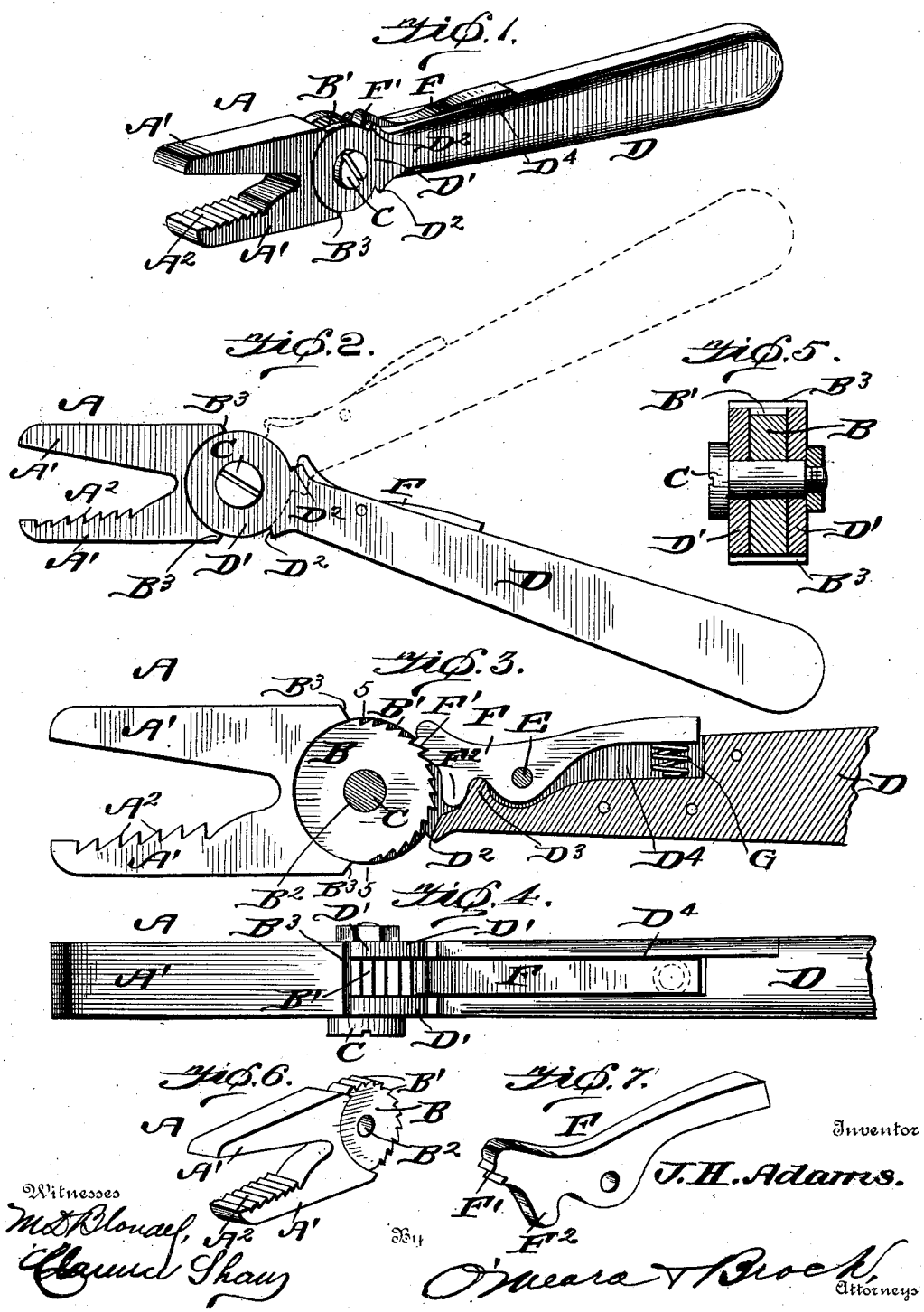

No. 744,271.                                      Patented November 17, 1903.

UNITED STATES PATENT OFFICE.

JAMES H. ADAMS, OF FULLERTON, CALIFORNIA.

WRENCH.

SPECIFICATION forming part of Letters Patent No. 744,271, dated November 17, 1903.

Application filed April 20, 1903. Serial No. 153,527. (No model.)

*To all whom it may concern:*

Be it known that I, JAMES H. ADAMS, a citizen of the United States, residing at Fullerton, in the county of Orange and State of California, have invented a new and useful Wrench, of which the following is a specification.

My invention relates to an improved ratchet-wrench, and has for its object to provide a device which shall be exceedingly simple and durable in construction, cheap as to cost, and highly efficient in its operation.

With these briefly-stated objects in view my invention comprises the head-section having a circular tongue whose edge is provided with ratchet-teeth and adapted for engagement by a spring-actuated dog carried by the handle-section, which is pivotally held to the said tongue, so that the head and tongue may be adjusted at various angles, as conditions may necessitate.

My invention also comprises the peculiar features and combination and arrangement of parts as will be clearly set forth in the following specification and pointed out in the claims, reference being had to the drawings, in which—

Figure 1 is a perspective view of my improved wrench. Fig. 2 is an elevation of the same, showing the handle arranged in several positions with respect to the head. Fig. 3 is a longitudinal section drawn through a portion of the handle, the head and dog being shown in elevation. Fig. 4 is a detail plan view. Fig. 5 is a detail section drawn on the line 5 5 of Fig. 3; and Figs. 6 and 7 are detail perspective views of the head and dog, respectively.

In the drawings I have shown my improvement constructed as a pipe-wrench; but it will of course be understood that the opening in the head may be made rectangular, so that the wrench can be used upon bolts, nuts, and the like; but as my wrench is particularly designed for plumbers, steam-fitters, and boiler-makers I have shown a head such as will be used upon pipes, and by reference to the drawings the character A designates the head of the wrench, the forward end being bifurcated to form the jaws A', one of which being provided with teeth $A^2$. The rear end of the head is reduced to form a circular tongue B, whose outer edge is provided with ratchet-teeth B', and the said tongue is centrally apertured at $B^2$ to receive the pivot-bolt C, by which the handle D is pivotally held to the head. The handle D has its forward end bifurcated, and each section D' formed thereby is apertured to receive the bolt C and shaped to conform to the shape of the tongue B, suitable lugs or shoulders $D^2$ being formed upon the handle, which engage the shoulders $B^3$, formed upon the head, when the handle is turned to an extreme position. In rear of the bifurcated end of the handle the latter is recessed, as at $D^4$, and pivotally held in this recess by a bolt E is a dog F, the forward end of which having teeth F', which engage the teeth B', formed upon the head. The rear end of the dog is projected a slight distance above the plane of the handle by means of a spring G, and this spring also serves to force the forward or toothed section of the dog into engagement with the ratchet-teeth of the head. If desirable for the sake of cheapness of manufacture, the handle may be made in sections, as represented in the drawings; but it may be cast in one piece, if desired. The forward end of the recess is provided in advance of the pivot-bolt E with a lug $D^3$, against which a lug $F^2$, formed upon the dog, is designed to engage for the purpose of limiting the extreme movements of the said dog.

By the construction just described it will be readily apparent that I have provided a tool that will be found particularly useful in working in corners or places where it is impossible to obtain a long or free swing of the handle, as the head can be quickly and easily adjusted upon the handle to various angles, and the importance of this feature will be readily appreciated by those skilled in the art to which my invention appertains.

Having thus fully described my invention, what I claim as new, and desire to secure by Letters Patent, is—

1. A wrench comprising a head having one end reduced forming a circular tongue provided with ratchet on its periphery, a handle having its forward end bifurcated and between which bifurcations, the head is pivoted the handle being provided with a longitudinal recess on its bifurcated end, said recess having a lug in its bottom, a dog pivoted in the recess of the handle and provided with teeth at its forward end engaging the teeth on the tongue of the head and a recess to receive the lug in the recess of the head, and a spring in the recess of the handle and engaging the under side of the dog, substantially as shown and described.

2. In a wrench substantially as described, the combination of the head having one end reduced providing a circular tongue which is centrally apertured, the ratchet-teeth formed upon the tongue, the shoulders arranged upon the head adjacent the ratchet-teeth, of a handle-section having its forward end bifurcated the members formed thereby being arranged upon opposite sides of the said tongue, a bolt for pivotally locking the said handle to the head, the shoulders formed upon the handle, the dog pivotally held in the recess arranged within the handle adjacent the bifurcated end, the forward end of the dog having teeth arranged thereon that are adapted for engagement with the teeth formed upon the tongue, a thumb portion formed upon the dog, a spring arranged within the recess and engaging the under side of the dog, and the lugs arranged within the recess and adapted for engagement by the lug carried by the dog, all substantially as and for the purpose specified.

JAMES H. ADAMS.

Witnesses:
T. B. VAN ALSTYNE,
H. K. ADAMS.